(No Model.)
W. CURTISS.
MACHINE FOR DRESSING THE TEETH OF GEAR WHEELS.
No. 431,139. Patented July 1, 1890.
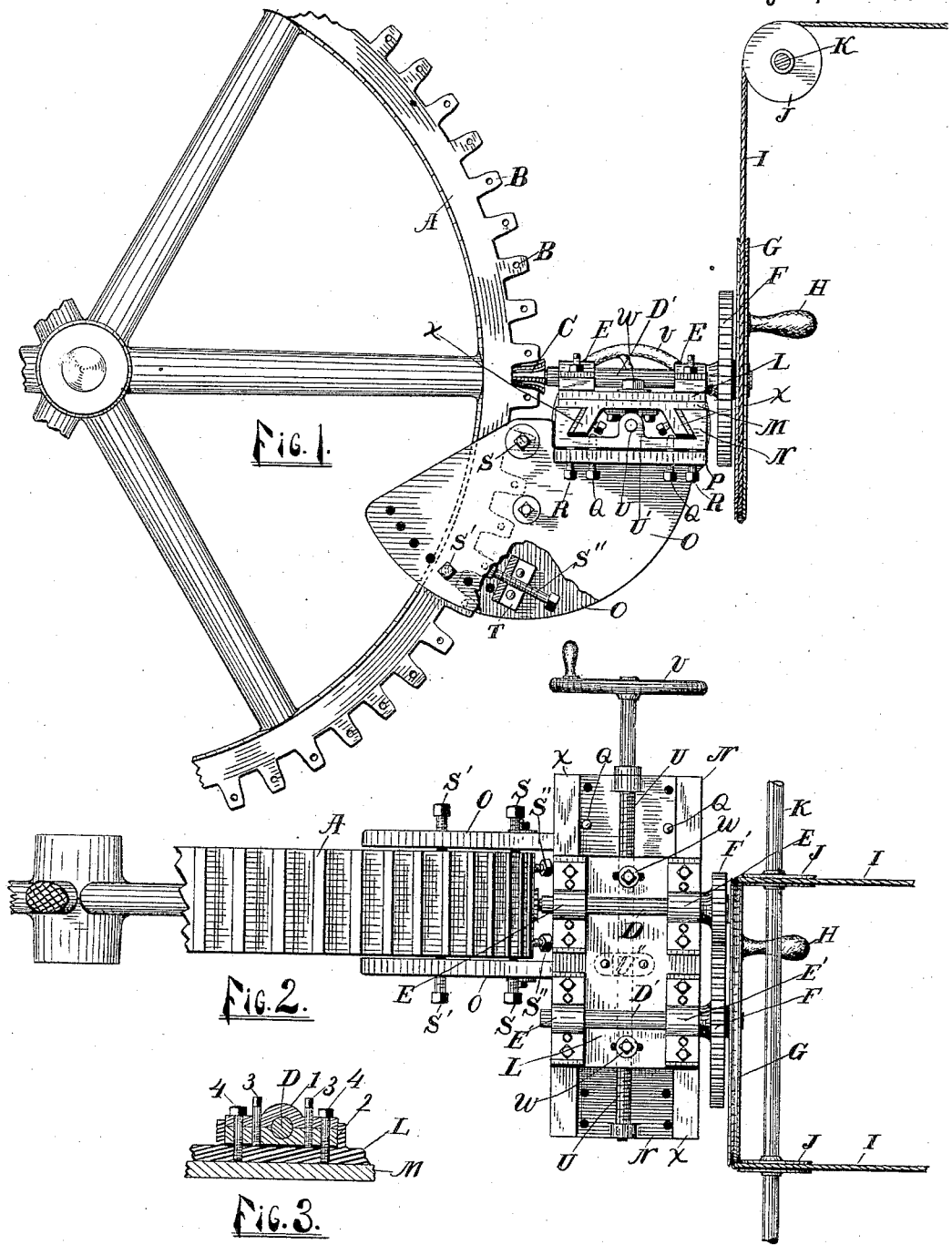
WITNESSES:
George W. Shook.
Claude R. Buchanan
INVENTOR
Willard Curtiss:
BY
Moulton & Rogers
ATTORNEYS

UNITED STATES PATENT OFFICE.

WILLARD CURTISS, OF GRAND RAPIDS, MICHIGAN, ASSIGNOR TO WM. T. POWERS AND WM. H. POWERS, BOTH OF SAME PLACE.

MACHINE FOR DRESSING THE TEETH OF GEAR-WHEELS.

SPECIFICATION forming part of Letters Patent No. 431,139, dated July 1, 1890.

Application filed April 19, 1890. Serial No. 348,729. (No model.)

*To all whom it may concern:*

Be it known that I, WILLARD CURTISS, a citizen of the United States, residing at Grand Rapids, in the county of Kent and State of Michigan, have invented certain new and useful Improvements in Machines for Dressing the Teeth of Gear-Wheels; and I do hereby declare the following to be a full, clear, and exact description of the invention, such as will enable others skilled in the art to which it appertains to make and use the same.

My invention relates to a portable machine for dressing the teeth of gear-wheels, and the object thereof is to provide a compact portable machine adapted to be secured to the rim of the wheel and operate upon the teeth successively and be driven by hand or other power applied in any convenient manner from any available source, and which may be easily attached to large gear-wheels without removing them from their permanent positions; and the invention consists in the construction, combination, and arrangement of the various parts, as hereinafter described, and pointed out in the claims, reference being had to the accompanying drawings, wherein—

Figure 1 represents a side elevation of a device embodying my invention attached to a large gear-wheel and having a portion of bracket broken away; Fig. 2, a plan view of the same; and Fig. 3, a detail of the boxes in vertical section.

Like letters and numerals of reference indicate like parts throughout the drawings.

A represents a portion of a large gear-wheel, which may be arranged for handling in any convenient manner.

B B represent countersinks placed on the pitch-line at the tooth-centers, respectively, adapted to receive the ends of the set-screws S for attaching the machine.

C represents a rotary cutter having a reverse curved cutting-face corresponding in outline to the face and flank of the teeth to be dressed, and is secured upon the end of the shaft D, provided with a gear-wheel F' and communicates with the source of power through the gear F and driving-wheel G upon the shaft D'. I prefer to use a grooved wheel and round belt I, arranged as shown in the drawings and passing over the wheels J upon the shaft K to a source of power. (Not shown.) For the purpose of using hand-power I provide the wheel G with a handle H. The shafts D D' are journaled in adjustable boxes E, consisting of the parts arranged as shown in Fig. 3, wherein 1 represents the cap; 2, the box; 3 3, adjusting-screws, and 4 4 binding-screws securing the boxes to the table L, upon which they are mounted and which is provided with slots, in which are the binding-screws W W, whereby the cutter may be moved toward and away from the wheel. The table L rests upon a carriage M, to which it is attached by said binding-screws W. Said carriage rests upon a bed N, which is provided with dovetailed ways X X for the carriage and supports the feed-screw U in suitable bearings, the feed-screw being provided with a suitable nut U', secured to the under side of the carriage, (shown in dotted line in Fig. 2,) and a hand-wheel V, whereby the carriage may be moved back and forth across the face of the wheel A. The bed N is supported upon suitable brackets O O, arranged upon each side of the wheel and having projecting flanges P P, by which the bed is adjustably secured to the brackets by the binding-screws Q Q and adjusting-screws R R.

The machine is attached to the wheel A by set-screws S, engaging with the countersinks B and S', engaging the rim of the wheel and passing horizontally through the brackets, and may be horizontally adjusted by adjusting-screw S", arranged in a plate T, secured to the inside of the brackets, the end of the screw S" engaging the point of one of the teeth in the wheel A.

The machine operates as follows: Motion being communicated to the drive-wheel G is communicated to the cutter C through the gears F F', the shaft D being correctly aligned and the various parts adjusted by the means provided, as herein set forth, the cutter C arranged in one of the spaces between the teeth to be dressed, and its surface in contact with the teeth. Such teeth may be dressed by causing the cutter to traverse the space, and by using cutters of suitable size the sides of two teeth may be dressed at the same time. By loosening the set-screws S S' the machine may be shifted from space to space until all of the teeth are dressed. It is obvious that the countersinks B should be placed at the exact centers of the teeth upon the pitch-line, or at other equidistant radial points from the axis of the wheel; also, that the cutter C may be placed upon the shaft D' and only one shaft used, if desired.

What I claim is—

1. A machine for dressing the teeth of gear-wheels, comprising the following elements in combination, viz: brackets adapted to be secured to the side of the rim of the wheel to be operated upon, a bed adjustably secured to said brackets, a carriage adapted to move upon said bed, a table mounted on the carriage, a rotary cutter secured to a shaft journaled to the table in suitable bearings, and a means of rotating the cutter-shaft, substantially as set forth.

2. In a machine for dressing the teeth of gear-wheels, the combination of a supporting frame-work adjustably secured to the wheel to be operated upon, a carriage adapted to traverse the face of said wheel carrying a rotary cutter secured to a shaft journaled on said carriage, and a means of moving the carriage and of rotating the cutter-shaft, substantially as set forth.

3. In a machine for dressing the teeth of gear-wheels, the combination of brackets provided with set-screws for attaching to the rim of the wheel to be operated upon, and screws S'' for horizontal adjustment, substantially as described, a rotary cutter adapted to the teeth of said gear-wheel secured upon a shaft journaled to a table mounted on a horizontally-movable carriage supported on said brackets, and means of rotating said cutter-shaft, substantially as described.

4. In a machine for dressing the teeth of gear-wheels, and in combination with brackets secured to the rim of the wheel for supporting the operating mechanism, substantially as described, a bed adjustably attached to the brackets, a carriage adapted to move upon the bed, a feed-screw for operating the carriage, a table mounted on the carriage provided with means of transverse adjustment toward and away from the wheel, a rotary cutter adapted to dress the teeth of the gear-wheel journaled in suitable adjustable boxes mounted on the table, and means of rotating the cutter-shaft, substantially as set forth.

5. A portable machine for dressing the teeth of gear-wheels, comprising the following elements in combination: brackets O O, arranged upon each side of the gear-wheel, provided with set-screws S S' and adjusting-screws S'' S'', arranged as described, and having flanges P, for supporting a bed and provided with vertical apertures for bolts, binding-screws Q Q, and set-screws R R, arranged in the apertures, a bed supported on said brackets, a carriage provided with a feed-screw U, adapted to travel on said bed, a table L, adjustably attached to the carriage, adjustable boxes E, secured to the table-cutter C, and shafts D D', having gears F F', and driving-wheel G, arranged as described, and belt I, wheels J J, and shaft K, arranged substantially as described, and for the purposes set forth.

In testimony whereof I affix my signature in presence of two witnesses.

WILLARD CURTISS.

Witnesses:
DENNIS L. ROGERS,
WM. H. POWERS.